US009769655B2

(12) United States Patent
Sheu

(10) Patent No.: US 9,769,655 B2
(45) Date of Patent: Sep. 19, 2017

(54) SHARING SECURITY KEYS WITH HEADLESS DEVICES

(71) Applicant: Ruckus Wireless, Inc., Sunnyvale, CA (US)

(72) Inventor: Ming-Jye Sheu, San Jose, CA (US)

(73) Assignee: RUCKUS WIRELESS, INC., Sunnyvale, CA (US)

( * ) Notice: Subject to any disclaimer, the term of this patent is extended or adjusted under 35 U.S.C. 154(b) by 0 days.

(21) Appl. No.: 14/751,833

(22) Filed: Jun. 26, 2015

(65) Prior Publication Data

US 2015/0296377 A1     Oct. 15, 2015

Related U.S. Application Data

(63) Continuation-in-part of application No. 11/789,446, filed on Apr. 23, 2007, now Pat. No. 9,071,583.
(Continued)

(51) Int. Cl.
*H04L 29/06* (2006.01)
*H04W 12/04* (2009.01)
(Continued)

(52) U.S. Cl.
CPC ............ *H04W 12/04* (2013.01); *H04L 63/06* (2013.01); *H04L 63/0869* (2013.01); *H04L 63/0876* (2013.01); *H04W 12/06* (2013.01); *G06F 2221/2107* (2013.01); *H04L 63/0823* (2013.01); *H04L 63/101* (2013.01); *H04L 63/102* (2013.01); *H04W 28/18* (2013.01); *H04W 74/00* (2013.01)

(58) Field of Classification Search
CPC ...... H04W 28/18; H04L 63/0876; H04L 9/08; H04N 7/1675
USPC ........................................................ 380/278
See application file for complete search history.

(56) References Cited

U.S. PATENT DOCUMENTS 4,176,356 A    11/1979   Foster
4,193,077 A     3/1980   Greenberg
(Continued)

FOREIGN PATENT DOCUMENTS

CN          1708162      12/2005
CN          1316862      10/2011
(Continued)

OTHER PUBLICATIONS

US 9,015,816, 04/2015, Sheu (withdrawn)
(Continued)

*Primary Examiner* — Ellen Tran
(74) *Attorney, Agent, or Firm* — Lewis Roca Rothgerber Christie LLP

(57) ABSTRACT

Systems and methods for provisioned configuration of wireless devices to allow access to restricted wireless networks are provided. Using an open wireless or wired network, a user of a wireless device may be authenticated. A configuration application, which includes the parameters and policies of the provisioned configuration, is generated, transferred to, and executed on the wireless device. Following configuration by the application, the wireless device is allowed to access the restricted wireless network within the parameters and policies of the provisioned configuration.

11 Claims, 8 Drawing Sheets

Related U.S. Application Data which is a continuation-in-part of application No. 11/788,371, filed on Apr. 18, 2007, now Pat. No. 7,788,703.

(60) Provisional application No. 60/794,625, filed on Apr. 24, 2006, provisional application No. 60/796,845, filed on May 2, 2006.

(51) Int. Cl.
*H04W 12/06* (2009.01)
*H04W 28/18* (2009.01)
*H04W 74/00* (2009.01)

(56) References Cited

U.S. PATENT DOCUMENTS

| | | |
|---|---|---|
| 4,253,193 A | 2/1981 | Kennard |
| 4,305,052 A | 12/1981 | Baril |
| 4,513,412 A | 4/1985 | Cox |
| 4,814,777 A | 3/1989 | Monser |
| 5,097,484 A | 3/1992 | Akaiwa |
| 5,173,711 A | 12/1992 | Takeuchi |
| 5,203,010 A | 4/1993 | Felix |
| 5,220,340 A | 6/1993 | Shafai |
| 5,373,548 A | 12/1994 | McCarthy |
| 5,507,035 A | 4/1996 | Bantz |
| 5,559,800 A | 9/1996 | Mousseau |
| 5,754,145 A | 5/1998 | Evans |
| 5,767,809 A | 6/1998 | Chuang |
| 5,802,312 A | 9/1998 | Lazaridis |
| 5,964,830 A | 10/1999 | Durrett |
| 6,034,638 A | 3/2000 | Thiel |
| 6,094,177 A | 7/2000 | Yamamoto |
| 6,266,528 B1 | 7/2001 | Farzaneh |
| 6,292,153 B1 | 9/2001 | Aiello |
| 6,307,524 B1 | 10/2001 | Britain |
| 6,317,599 B1 | 11/2001 | Rappaport |
| 6,326,922 B1 | 12/2001 | Hegendoerfer |
| 6,337,628 B2 | 1/2002 | Campana |
| 6,337,668 B1 | 1/2002 | Ito |
| 6,339,404 B1 | 1/2002 | Johnson |
| 6,345,043 B1 | 2/2002 | Hsu |
| 6,356,242 B1 | 3/2002 | Ploussios |
| 6,356,243 B1 | 3/2002 | Schneider |
| 6,356,905 B1 | 3/2002 | Gershman |
| 6,377,227 B1 | 4/2002 | Zhu |
| 6,392,610 B1 | 5/2002 | Braun |
| 6,404,386 B1 | 6/2002 | Proctor |
| 6,407,719 B1 | 6/2002 | Ohira |
| 6,442,507 B1 | 8/2002 | Skidmore |
| 6,445,688 B1 | 9/2002 | Garces |
| 6,493,679 B1 | 12/2002 | Rappaport |
| 6,498,589 B1 | 12/2002 | Horii |
| 6,499,006 B1 | 12/2002 | Rappaport |
| 6,507,321 B2 | 1/2003 | Oberschmidt |
| 6,625,454 B1 | 9/2003 | Rappaport |
| 6,674,459 B2 | 1/2004 | Ben-Shachar |
| 6,701,522 B1 | 3/2004 | Rubin |
| 6,725,281 B1 | 4/2004 | Zintel |
| 6,753,814 B2 | 6/2004 | Killen |
| 6,762,723 B2 | 7/2004 | Nallo |
| 6,772,331 B1 | 8/2004 | Hind et al. |
| 6,779,004 B1 | 8/2004 | Zintel |
| 6,807,577 B1 | 10/2004 | Gillespie |
| 6,819,287 B2 | 11/2004 | Sullivan |
| 6,876,280 B2 | 4/2005 | Nakano |
| 6,888,504 B2 | 5/2005 | Chiang |
| 6,888,893 B2 | 5/2005 | Li |
| 6,892,230 B1 | 5/2005 | Gu |
| 6,906,678 B2 | 6/2005 | Chen |
| 6,910,068 B2 | 6/2005 | Zintel |
| 6,924,768 B2 | 8/2005 | Wu |
| 6,931,429 B2 | 8/2005 | Gouge |
| 6,941,143 B2 | 9/2005 | Mathur |
| 6,947,727 B1 | 9/2005 | Brynielsson |
| 6,950,019 B2 | 9/2005 | Bellone |
| 6,950,523 B1 | 9/2005 | Brickell |
| 6,961,028 B2 | 11/2005 | Joy |
| 6,973,622 B1 | 12/2005 | Rappaport |
| 6,975,834 B1 | 12/2005 | Forster |
| 7,034,770 B2 | 4/2006 | Yang |
| 7,043,277 B1 | 5/2006 | Pfister |
| 7,043,633 B1 | 5/2006 | Fink et al. |
| 7,050,809 B2 | 5/2006 | Lim |
| 7,064,717 B2 | 6/2006 | Kaluzni |
| 7,085,814 B1 | 8/2006 | Gandhi |
| 7,089,307 B2 | 8/2006 | Zintel |
| 7,116,707 B1 | 10/2006 | Armistead |
| 7,127,234 B2 | 10/2006 | Ishii |
| 7,130,895 B2 | 10/2006 | Zintel |
| 7,171,475 B2 | 1/2007 | Weisman |
| 7,181,620 B1 | 2/2007 | Hur |
| 7,197,297 B2 | 3/2007 | Myles |
| 7,234,063 B1 | 6/2007 | Baugher |
| 7,234,156 B2 | 6/2007 | French et al. |
| 7,263,076 B1 | 8/2007 | Leibovitz et al. |
| 7,292,870 B2 | 11/2007 | Heredia et al. |
| 7,363,354 B2 | 4/2008 | Lahti |
| 7,421,578 B1 | 9/2008 | Huang et al. |
| 7,477,894 B1 | 1/2009 | Sinha |
| 7,505,434 B1 | 3/2009 | Backes |
| 7,562,385 B2 | 7/2009 | Thione et al. |
| 7,565,529 B2 | 7/2009 | Beck |
| 7,599,380 B2 | 10/2009 | Whitten |
| 7,669,232 B2 | 2/2010 | Jou |
| 7,715,833 B2 | 5/2010 | Sanchez |
| 7,722,502 B2 | 5/2010 | Holkkola |
| 7,788,703 B2 | 8/2010 | Jou |
| 7,966,497 B2 | 6/2011 | Gantman et al. |
| 8,005,459 B2 | 8/2011 | Balsillie |
| 8,009,644 B2 | 8/2011 | Kuo |
| 8,091,120 B2 | 1/2012 | Perrella et al. |
| 8,108,904 B1 | 1/2012 | Chickering et al. |
| 8,260,278 B2 | 9/2012 | Landsman et al. |
| 8,272,036 B2 | 9/2012 | Jou |
| 8,355,912 B1 | 1/2013 | Keesey et al. |
| 8,605,697 B2 | 12/2013 | Kuo |
| 8,607,315 B2 | 12/2013 | Jou |
| 8,756,668 B2 | 6/2014 | Ranade et al. |
| 8,923,265 B2 | 12/2014 | Kuo |
| 9,071,583 B2 | 6/2015 | Yang |
| 9,092,610 B2 | 7/2015 | Sheu |
| 9,131,378 B2 | 9/2015 | Jou |
| 9,226,146 B2 | 12/2015 | Ranade et al. |
| 2002/0009199 A1 | 1/2002 | Ala-Laurila et al. |
| 2002/0022483 A1 | 2/2002 | Thompson et al. |
| 2002/0031130 A1 | 3/2002 | Tsuchiya |
| 2002/0047800 A1 | 4/2002 | Proctor |
| 2002/0080767 A1 | 6/2002 | Lee |
| 2002/0084942 A1 | 7/2002 | Tsai |
| 2002/0105471 A1 | 8/2002 | Kojima |
| 2002/0112058 A1 | 8/2002 | Weisman |
| 2002/0158798 A1 | 10/2002 | Chiang |
| 2002/0169966 A1 | 11/2002 | Nyman |
| 2002/0170064 A1 | 11/2002 | Monroe |
| 2003/0026240 A1 | 2/2003 | Eyuboglu |
| 2003/0030588 A1 | 2/2003 | Kalis |
| 2003/0063591 A1 | 4/2003 | Leung |
| 2003/0122714 A1 | 7/2003 | Wannagot |
| 2003/0156558 A1 | 8/2003 | Cromer et al. |
| 2003/0162533 A1 | 8/2003 | Moles |
| 2003/0169330 A1 | 9/2003 | Ben-Shachar |
| 2003/0184490 A1 | 10/2003 | Raiman |
| 2003/0189514 A1 | 10/2003 | Miyano |
| 2003/0189521 A1 | 10/2003 | Yamamoto |
| 2003/0189523 A1 | 10/2003 | Ojantakanen |
| 2003/0191935 A1 | 10/2003 | Ferguson |
| 2003/0196084 A1 | 10/2003 | Okereke |
| 2003/0202486 A1 | 10/2003 | Anton et al. |
| 2003/0210207 A1 | 11/2003 | Suh |
| 2003/0227414 A1 | 12/2003 | Saliga |
| 2004/0014432 A1 | 1/2004 | Boyle |
| 2004/0017310 A1 | 1/2004 | Vargas-Hurlston et al. |

(56) References Cited

U.S. PATENT DOCUMENTS

| | | |
|---|---|---|
| 2004/0017860 A1 | 1/2004 | Liu |
| 2004/0027291 A1 | 2/2004 | Zhang |
| 2004/0027304 A1 | 2/2004 | Chiang |
| 2004/0030900 A1 | 2/2004 | Clark |
| 2004/0032378 A1 | 2/2004 | Volman |
| 2004/0036651 A1 | 2/2004 | Toda |
| 2004/0036654 A1 | 2/2004 | Hsieh |
| 2004/0041732 A1 | 3/2004 | Aikawa |
| 2004/0048593 A1 | 3/2004 | Sano |
| 2004/0058690 A1 | 3/2004 | Ratzel |
| 2004/0061653 A1 | 4/2004 | Webb |
| 2004/0070543 A1 | 4/2004 | Masaki |
| 2004/0073786 A1 | 4/2004 | O'Neill |
| 2004/0080455 A1 | 4/2004 | Lee |
| 2004/0095278 A1 | 5/2004 | Kanemoto |
| 2004/0097217 A1 | 5/2004 | McClain |
| 2004/0114535 A1 | 6/2004 | Hoffmann |
| 2004/0121749 A1 | 6/2004 | Cui et al. |
| 2004/0125777 A1 | 7/2004 | Doyle |
| 2004/0141617 A1 | 7/2004 | Volpano |
| 2004/0153647 A1 | 8/2004 | Rotholtz et al. |
| 2004/0190477 A1 | 9/2004 | Olson |
| 2004/0203593 A1 | 10/2004 | Whelan |
| 2004/0214570 A1 | 10/2004 | Zhang |
| 2004/0214572 A1 | 10/2004 | Thompson et al. |
| 2004/0260800 A1 | 12/2004 | Gu |
| 2005/0010680 A1* | 1/2005 | Zick .......... H04L 63/0853 709/237 |
| 2005/0022210 A1 | 1/2005 | Zintel |
| 2005/0041739 A1 | 2/2005 | Li |
| 2005/0042988 A1 | 2/2005 | Hoek |
| 2005/0050352 A1 | 3/2005 | Narayanaswami et al. |
| 2005/0074018 A1 | 4/2005 | Zintel |
| 2005/0097503 A1 | 5/2005 | Zintel |
| 2005/0100166 A1 | 5/2005 | Smetters |
| 2005/0129222 A1 | 6/2005 | Creamer et al. |
| 2005/0135480 A1 | 6/2005 | Li |
| 2005/0138137 A1 | 6/2005 | Encamacion |
| 2005/0138193 A1 | 6/2005 | Encamacion |
| 2005/0152305 A1 | 7/2005 | Ji et al. |
| 2005/0165953 A1 | 7/2005 | Oba et al. |
| 2005/0180381 A1 | 8/2005 | Retzer |
| 2005/0188193 A1 | 8/2005 | Kuehnel |
| 2005/0220048 A1 | 10/2005 | Lee et al. |
| 2005/0222933 A1 | 10/2005 | Wesby |
| 2005/0228874 A1 | 10/2005 | Edgett |
| 2005/0240665 A1 | 10/2005 | Gu |
| 2005/0250472 A1 | 11/2005 | Silvester |
| 2005/0261970 A1 | 11/2005 | Vucina et al. |
| 2005/0267935 A1 | 12/2005 | Gandhi |
| 2005/0268107 A1 | 12/2005 | Harris |
| 2006/0007897 A1 | 1/2006 | Ishii |
| 2006/0031922 A1 | 2/2006 | Sakai |
| 2006/0046730 A1 | 3/2006 | Briancon et al. |
| 2006/0052085 A1 | 3/2006 | Gregrio Rodriguez et al. |
| 2006/0080415 A1 | 4/2006 | Tu |
| 2006/0080741 A1 | 4/2006 | Nair |
| 2006/0089123 A1 | 4/2006 | Frank |
| 2006/0094371 A1 | 5/2006 | Nguyen |
| 2006/0094400 A1 | 5/2006 | Beachem et al. |
| 2006/0098607 A1 | 5/2006 | Zeng |
| 2006/0123124 A1 | 6/2006 | Weisman |
| 2006/0123125 A1 | 6/2006 | Weisman |
| 2006/0123455 A1 | 6/2006 | Pai |
| 2006/0133405 A1 | 6/2006 | Fee |
| 2006/0165103 A1 | 7/2006 | Trudeau et al. |
| 2006/0168159 A1 | 7/2006 | Weisman |
| 2006/0184660 A1 | 8/2006 | Rao |
| 2006/0184661 A1 | 8/2006 | Weisman |
| 2006/0184693 A1 | 8/2006 | Rao |
| 2006/0189298 A1 | 8/2006 | Marcelli |
| 2006/0200851 A1 | 9/2006 | Hung |
| 2006/0223527 A1 | 10/2006 | Lee et al. |
| 2006/0224690 A1 | 10/2006 | Falkenburg |
| 2006/0225107 A1 | 10/2006 | Seetharaman |
| 2006/0227761 A1 | 10/2006 | Scott |
| 2006/0239369 A1 | 10/2006 | Lee |
| 2006/0251256 A1 | 11/2006 | Asokan et al. |
| 2006/0291434 A1 | 12/2006 | Gu |
| 2007/0025302 A1 | 2/2007 | Zhang et al. |
| 2007/0027622 A1 | 2/2007 | Cleron |
| 2007/0047449 A1 | 3/2007 | Berger et al. |
| 2007/0055752 A1 | 3/2007 | Wiegand et al. |
| 2007/0124490 A1 | 5/2007 | Kalavade et al. |
| 2007/0130294 A1 | 6/2007 | Nishio |
| 2007/0130456 A1 | 6/2007 | Kuo |
| 2007/0135167 A1 | 6/2007 | Liu |
| 2007/0143832 A1 | 6/2007 | Perrella et al. |
| 2007/0150736 A1 | 6/2007 | Cukier |
| 2007/0165582 A1 | 7/2007 | Batta |
| 2007/0189537 A1 | 8/2007 | Zhang et al. |
| 2007/0199053 A1 | 8/2007 | Sandhu et al. |
| 2007/0211659 A1 | 9/2007 | Li et al. |
| 2007/0249324 A1 | 10/2007 | Jou |
| 2007/0287450 A1 | 12/2007 | Yang |
| 2007/0293951 A1 | 12/2007 | Takahashi |
| 2007/0294528 A1 | 12/2007 | Shoji et al. |
| 2008/0060064 A1 | 3/2008 | Wynn et al. |
| 2008/0075280 A1 | 3/2008 | Ye et al. |
| 2008/0085723 A1 | 4/2008 | Tsao et al. |
| 2008/0089242 A1 | 4/2008 | Whitten |
| 2008/0109657 A1 | 5/2008 | Bajaj et al. |
| 2008/0119165 A1 | 5/2008 | Mittal et al. |
| 2008/0141244 A1 | 6/2008 | Kelley |
| 2008/0208617 A1 | 8/2008 | Onyon et al. |
| 2008/0212535 A1 | 9/2008 | Karaoguz et al. |
| 2008/0307515 A1 | 12/2008 | Drokov et al. |
| 2009/0005005 A1 | 1/2009 | Forstall et al. |
| 2009/0013210 A1 | 1/2009 | McIntosh et al. |
| 2009/0092255 A1 | 4/2009 | Jou |
| 2009/0103731 A1 | 4/2009 | Sarikaya |
| 2009/0119190 A1 | 5/2009 | Realini |
| 2009/0187970 A1 | 7/2009 | Mower et al. |
| 2009/0193118 A1 | 7/2009 | Cox et al. |
| 2009/0217048 A1 | 8/2009 | Smith |
| 2010/0070542 A1 | 3/2010 | Feinsmith |
| 2010/0299518 A1 | 11/2010 | Viswanathan et al. |
| 2010/0332828 A1 | 12/2010 | Goto |
| 2011/0007705 A1 | 1/2011 | Buddhikot et al. |
| 2011/0035624 A1 | 2/2011 | Miller |
| 2011/0040870 A1 | 2/2011 | Wynn et al. |
| 2011/0047603 A1 | 2/2011 | Gordon et al. |
| 2011/0055898 A1 | 3/2011 | Jou |
| 2011/0126016 A1 | 5/2011 | Sun |
| 2011/0208866 A1 | 8/2011 | Marmolejo-Meillon et al. |
| 2011/0271111 A1 | 11/2011 | Frank et al. |
| 2011/0281609 A1 | 11/2011 | Kuo |
| 2012/0030466 A1 | 2/2012 | Yamaguchi |
| 2012/0054338 A1 | 3/2012 | Ando |
| 2012/0078949 A1 | 3/2012 | Allen et al. |
| 2012/0089845 A1 | 4/2012 | Raleigh |
| 2012/0134291 A1 | 5/2012 | Raleigh |
| 2012/0257536 A1 | 10/2012 | Kholaif et al. |
| 2012/0278654 A1 | 11/2012 | Shen |
| 2012/0284785 A1 | 11/2012 | Salkintzis et al. |
| 2012/0317625 A1 | 12/2012 | Jou |
| 2012/0322035 A1 | 12/2012 | Julia et al. |
| 2013/0007853 A1 | 1/2013 | Gupta et al. |
| 2013/0047218 A1 | 2/2013 | Smith |
| 2013/0182693 A1 | 7/2013 | Sperling et al. |
| 2013/0269008 A1 | 10/2013 | Sheu et al. |
| 2014/0007209 A1 | 1/2014 | Zucker |
| 2014/0053281 A1* | 2/2014 | Benoit ............ H04L 12/2809 726/29 |
| 2014/0066112 A1 | 3/2014 | Kuo |
| 2014/0068724 A1 | 3/2014 | Jou |
| 2014/0247943 A1* | 9/2014 | Harkins .......... G06F 9/4411 380/282 |
| 2014/0282951 A1 | 9/2014 | Ranade |
| 2015/0133089 A1 | 5/2015 | Kuo |
| 2015/0257009 A1 | 9/2015 | Sheu |

(56) References Cited

U.S. PATENT DOCUMENTS

FOREIGN PATENT DOCUMENTS

| CN | 103441984 | 12/2013 |
|---|---|---|
| CN | 103858106 | 6/2014 |
| EP | 0 352 787 | 7/1989 |
| EP | 0 534 612 | 3/1993 |
| EP | 1 315 311 | 5/2003 |
| EP | 1 450 521 | 8/2004 |
| EP | 1 608 108 | 12/2005 |
| EP | 1 638 261 | 3/2006 |
| EP | 1 724 691 | 11/2006 |
| EP | 2 705 429 | 3/2014 |
| EP | 1 958 369 | 4/2015 |
| JP | 3038933 | 7/1989 |
| JP | 2008/088633 | 2/1996 |
| JP | 2001/057560 | 2/2002 |
| JP | 2005/354249 | 12/2005 |
| JP | 2006/060408 | 3/2006 |
| JP | 2014-522142 | 8/2014 |
| TW | 201351188 | 12/2013 |
| WO | WO 01/84323 | 11/2001 |
| WO | WO 02/25967 | 3/2002 |
| WO | WO 03/079484 | 9/2003 |
| WO | WO 2007/064822 | 6/2007 |
| WO | WO 2007/127120 | 11/2007 |
| WO | WO 2007/127162 | 11/2007 |
| WO | WO 2012/151224 | 11/2012 |
| WO | WO 2013/119750 | 8/2013 |
| WO | WO 2013/152027 | 10/2013 |

OTHER PUBLICATIONS

Chinese Office Action for CN Application No. 201280021332.7 dated Dec. 11, 2015.
Aboba, Bernard "Virtual Access Points," IEEEP802.11 Wireless LANs, XX, XX, No. 802.11-03/154rI, May 22, 2003.
Areg Alimian et al., "Analysis of Roaming Techniques," doc.:IEEE 802.11-04/0377r1, Submission, Mar. 2004.
Bargh et al., "Fast Authentication Methods for Handovers between IEEE 802.11 Wireless LANs", Proceedings of the ACM International Workshop on Wireless Mobile Applications and Services on WLAN Hotspots. Oct. 1, 2004.
Chang, Nicholas B. et al., "Optimal Channel Probing and Transmission Scheduling for Opportunistics Spectrum Access," Sep. 2007.
Cisco Systems, "Cisco Aironet Access Point Software Configuration Guide: Configuring Filters and Quality of Service," Aug. 2003.
Dell Inc., "How Much Broadcast and Multicast Traffic Should I Allow in My Network," PowerConnect Application Note #5, Nov. 2003.
Dunkels, Adam et al., "Connecting Wireless Sensornets with TCP/IP Networks," Proc. of the 2d Int'l Conf. on Wired Networks, Frankfurt, Feb. 2004.
Dunkels, Adam et al., "Making TCP/IP Viable for Wireless Sensor Networks," Proc. of the 1st Euro. Workshop on Wireless Sensor Networks, Berlin, Jan. 2004.
Dutta, Ashutosh et al., "MarconiNet Supporting Streaming Media Over Localized Wireless Multicast," Proc. of the 2d Int'l Workshop on Mobile Commerce, 2002.
Encrypted Preshared key; cisco corp. 14 pages, 2010 (Date of Download: Nov. 20, 2013).
Festag, Andreas, "What is MOMBASA?" Telecommunication Networks Group (TKN), Technical University of Berlin, Mar. 7, 2002.
Golmie, Nada, "Coexistence in Wireless Networks: Challenges and System-Level Solutions in the Unlicensed Bands," Cambridge University Press, 2006.
Hewlett Packard, "HP ProCurve Networking: Enterprise Wireless LAN Networking and Mobility Solutions," 2003.
Hirayama, Koji et al., "Next-Generation Mobile-Access IP Network," Hitachi Review vol. 49, No. 4, 2000.
Ian F. Akyildiz, et al., "A Virtual Topology Based Routing Protocol for Multihop Dynamic Wireless Networks," Broadband and Wireless Networking Lab, School of Electrical and Computer Engineering, Georgia Institute of Technology.
IEEE Trial-Use Recommended Practice for Multi-Vendor Access Point Interoperability via an Inter-Access Point Protocol Across Distribution Systems Supporting IEEE 802.11 Operation; IEEE Std 802.11 F-2003 ED, IEEE Standard, IEEE, Piscataway, NJ, USA, Jan. 1, 2003, pp. 1-67.
Information Society Technologies Ultrawaves, "System Concept / Architecture Design and Communication Stack Requirement Document," Feb. 23, 2004.
Kassab et al., "Fast Pre-Authentication Based on Proactive Key Distribution for 802.11 Infrastructure Networks", WMuNeP'05, Oct. 13, 2005, Montreal, Quebec, Canada, Copyright 2005 ACM.
Keidl et al., TES2003, LNCS v. 2819, pp. 104-118, Sep. 2003.
Ken Tang, et al., "MAC Layer Broadcast Support in 802.11 Wireless Networks," Computer Science Department, University of California, Los Angeles, 2000 IEEE, pp. 544-548.
Ken Tang, et al., "MAC Reliable Broadcast in Ad Hoc Networks," Computer Science Department, University of California, Los Angeles, 2001 IEEE, pp. 1008-1013.
Mawa, Rakesh, "Power Control in 3G Systems," Hughes Systique Corporation, Jun. 28, 2006.
Microsoft Corporation, "IEEE 802.11 Networks and Windows XP," Windows Hardware Developer Central, Dec. 4, 2001.
Pat Calhoun et al., "802.11r strengthens wireless voice," Technology Update, Network World, Aug. 22, 2005, http://www.networkworld.com/news/tech/2005/082208techupdate.html.
Steger, Christopher et al., "Performance of IEEE 802.11b Wireless LAN in an Emulated Mobile Channel," 2003.
Toskala, Antti, "Enhancement of Broadcast and Introduction of Multicast Capabilities in RAN," Nokia Networks, Palm Springs, California, Mar. 13-16, 2001.
Tsunekawa, Kouichi, "Diversity Antennas for Portable Telephones", 39th IEEE Vehicular Technology Conference, pp. 50-56, vol. 1, Gateway to New Concepts in Vehicular Technology, May 1-3, 1989, San Francisco, CA.
Vincent D. Park, et al., "A Performance Comparison of the Temporally-Ordered Routing Algorithm and Ideal Link-State Routing," IEEE, Jul. 1998, pp. 592-598.
Wennstrom, Mattias et al., "Transmit Antenna Diversity in Ricean Fading MIMO Channels with Co-Channel Interference," 2001.
Yang, Song Li, Virtual AP for 802.11 Seamless Handoff draft-song-80211-seamless-handoff-00.txt.
Extended European Search Report for EP application No. 07755678.5 mailed Dec. 29, 2011.
Extended European Search Report for EP application No. 06838713.3 mailed Jul. 13, 2011.
Extended European Search Report for EP application No. 12779857.7 dated Mar. 30, 2015.
Extended European Search Report for EP application No. 14163071.5 mailed Jul. 4, 2014.
Supplementary European Search Report for EP application No. 07755678.5 mailed Jan. 17, 2012.
PCT Application No. PCT/US2006/045893, International Search Report and Written Opinion Sep. 25, 2007.
PCT Application No. PCT/US2007/09836, International Search Report and Written Opinion Sep. 12, 2008.
PCT Application No. PCT/US2007/09503, International Search Report and Written Opinion Mar. 3, 2008.
PCT Application No. PCT/US2012/036028, International Search Report and Written Opinion Aug. 7, 2012.
PCT Application No. PCT/US2013/34997, International Search Report mailed Jun. 17, 2013.
PCT Application No. PCT/US2013/34997, Written Opinion mailed Jun. 17, 2013 (Date of Online Publication: Oct. 4, 2014).
Chinese Office Action for CN Application No. 200680045272.7 mailed Oct. 27, 2011.
Chinese Office Action for CN Application No. 200680045272.7 mailed Jul. 12, 2011.
Chinese Office Action for CN Application No. 200680045272.7 mailed Feb. 1, 2011.

(56) References Cited

OTHER PUBLICATIONS

Chinese Office Action for CN Application No. 200680045272.7 mailed Jul. 15, 2010.
Chinese Office Action for CN Application No. 200780019074.8 mailed Jun. 15, 2011.
Chinese Office Action for CN Application No. 200780019389.2 mailed Sep. 12, 2012.
Chinese Office Action for CN Application No. 200780019389.2 mailed Feb. 14, 2012.
Chinese Office Action for CN Application No. 200780019389.2 mailed Apr. 8, 2011.
European First Examination Report for EP Application No. 068387133 mailed Apr. 3, 2012.
European Second Examination Report for EP Application No. 07755678.5 dated Feb. 3, 2014.
European First Examination Report for EP Application No. 07755678.5 dated Oct. 23, 2012.
European First Examination Report for EP Application No. 07755913.6 dated Jul. 4, 2013.
U.S. Appl. No. 11/607,619, Office Action mailed Oct. 13, 2010.
U.S. Appl. No. 11/607,619, Final Office Action mailed Dec. 4, 2009.
U.S. Appl. No. 11/607,619, Office Action mailed Apr. 29, 2009.
U.S. Appl. No. 13/191,383, Office Action mailed Jul. 22, 2013.
U.S. Appl. No. 11/788,371, Final Office Action mailed Jan. 21, 2010.
U.S. Appl. No. 11/788,371, Office Action mailed Sep. 17, 2009.
U.S. Appl. No. 11/789,446, Final Office Action mailed Oct. 13, 2010.
U.S. Appl. No. 11/789,446, Office Action mailed May 24, 2010.
U.S. Appl. No. 11/789,446, Final Office Action mailed Jun. 24, 2009.
U.S. Appl. No. 11/789,446, Office Action mailed Sep. 3, 2008.
U.S. Appl. No. 12/339,688, Office Action mailed Sep. 15, 2009.
U.S. Appl. No. 12/845,089, Final Office Action mailed Feb. 14, 2012.
U.S. Appl. No. 12/845,089, Office Action mailed Sep. 6, 2011.
U.S. Appl. No. 13/590,997, Office Action mailed Jul. 18, 2013.
U.S. Appl. No. 14/078,947, Final Office Action mailed Feb. 23, 2015.
U.S. Appl. No. 14/078,947, Office Action mailed Sep. 24, 2014.
U.S. Appl. No. 13/370,201, Office Action mailed May 13, 2013.
U.S. Appl. No. 14/294,012, Office Action mailed Mar. 23, 2015.
U.S. Appl. No. 13/439,844, Office Action mailed Apr. 22, 2014.
U.S. Appl. No. 13/439,844, Final Office Action mailed Oct. 28, 2013.
U.S. Appl. No. 13/439,844, Office Action mailed Jun. 5, 2013.
U.S. Appl. No. 13/461,679, Final Office Action mailed May 28, 2015.
U.S. Appl. No. 13/461,679, Office Action mailed Mar. 28, 2014.
U.S. Appl. No. 13/461,679, Final Office Action mailed Oct. 25, 2013.
U.S. Appl. No. 13/461,679, Office Action mailed Apr. 1, 2013.
U.S. Appl. No. 14/692,485, Ming-Jye Sheu, Key Assignment for a Brand, filed Apr. 21, 2015.
U.S. Appl. No. 14/981,579, Prashant Ranade, Dynamic PSK for Hotspots, filed Dec. 28, 2015

\* cited by examiner

SHARING SECURITY KEYS WITH HEADLESS DEVICES

CROSS-REFERENCE TO RELATED APPLICATIONS

The present application is a continuation-in-part of U.S. patent application Ser. No. 11/789,446 filed Apr. 23, 2007 and entitled "Provisioned Configuration for Automatic Wireless Connection," which is a continuation-in-part of U.S. patent application Ser. No. 11/788,371 filed Apr. 18, 2007 and entitled "Dynamic Authentication in Secured Wireless Networks," which claims the priority benefit of U.S. provisional patent application No. 60/794,625 filed Apr. 24, 2006 and entitled "Mechanisms and Apparatus to Provide Pre-Shared Key Authentication with Dynamic Secret on Wireless Networks" and U.S. provisional patent application No. 60/796,845 filed May 2, 2006 and entitled "Mechanisms and Apparatus for Automatic Wireless Connection Based on Provisioned Configuration." The disclosures of the aforementioned applications are incorporated herein by reference.

BACKGROUND OF THE INVENTION

1. Field of the Invention

The present invention generally relates to information network security. More specifically, the present invention relates to user-friendly systems for configuring wireless devices for access to restricted wireless networks.

2. Description of Related Art

A variety of user authentication and security measures for wireless networks have been proposed by a number of professional organizations. These professional organizations include the Institute of Electrical and Electronics Engineers (IEEE) 802.11 Working Group, the Wi-Fi Alliance, and the Internet Engineering Task Force (IETF). Various other groups such as wireless equipment vendors offer their own proprietary wireless security protocols. Depending on the particular source, implementing these protocols has generally been complicated, difficult to maintain, and requires a high level of technical knowledge by those implementing a particular protocol.

In early wireless networks (e.g., IEEE 802.11 or Wi-Fi), security was achieved by wired equivalent privacy (WEP) systems. Deploying a WEP system requires only that a network administrator define a WEP key set at an access point or access device. Any user can access a WEP-secured wireless network by having the same WEP key set manually configured on that user's client station (e.g., a laptop or mobile device). The wireless data communication between the client station and the access point would be encrypted by a defined encryption algorithm utilizing the shared WEP key set.

While WEP may work to prevent casual trespassers from accessing the wireless network, WEP would not likely withstand more serious security attacks. WEP keys can be easily discovered, for example, by using publicly available software. Further, WEP does not work to protect network users from each other since all users share the same key. Because of these flaws in WEP-based security systems, alternative security measures evolved. These new measures generally required that wireless network users first be authenticated in some manner and that a key set then be derived and used for wireless traffic encryption. These proposed authentication measures can generally be categorized into two groups: Extensible Authentication Protocol (EAP) and Pre-Shared Key (PSK).

The EAP group of security measures generally follows the IEEE 802.1x standard, which utilizes the extensible authentication protocol. EAP-based security systems enable mutual authentication between an authentication server and its users. The authentication server may reside in an access point, base station or an external device. Generally, the authentication server provides for a derived pair-wise master key to be shared between an access point and the user client station. That pair-wise master key may be used to derive a key set, which may be used for data encryption.

A major obstacle in implementing EAP or IEEE 802.1x-based security systems is their complexity. Deploying such systems requires a high level of technical expertise, as well as ongoing technical support for users. Most EAP-based systems, for example, require security certificates to be installed onto authentication servers. Depending on the exact requirements of the EAP-based system, the client stations may also need to be granted the authority to root certificate updates and/or have the security certificate pre-installed before access to the wireless network can be granted.

In contrast, PSK security systems are based on a secret shared between and stored at both the client station and the access point. The secret may be, for example, a long bit stream, such as a passphrase, a password, a hexadecimal string, or the like. Used by a client station and the access point to authenticate each other, the secret may also be used to generate an encryption key set.

A major shortcoming of PSK-based systems is that the secret has to be manually entered onto client stations and shared by all the client stations. Once the shared secret becomes known to unauthorized personnel, the security of the entire network is compromised. This may pose a problem in organizations that need to provide network access to temporary employees or that have a highly mobile workforce. To maintain the security of a PSK-based system, the secret must be changed on all client stations whenever a person with knowledge of the secret departs from the organization or is no longer authorized to access the network.

Another complication is that each organization may have specialized needs with respect to security for its wireless networks. For example, different departments within an organization may require different protocols. Some individuals, however, may require access to multiple networks, which requires that their wireless device be configured with multiple protocols. Further, some individuals may require access to particular networks but may not be authorized to access those networks. As such, many commercial organizations (e.g., small- and medium-sized businesses) have difficulties implementing security systems for wireless networks because of their lack of expertise and/or full-time professional technical support.

For example, a network administrator may have the requisite technical knowledge to implement such security systems but may have to configure every wireless client station individually. This is in addition to instructing each user on how to configure their wireless device to conform to certain wireless connection parameters. Further, various technical complications may arise for users and network administrator personnel including different wireless devices and interfaces, different requirements for access, and different restrictions on access. Such wireless devices may include headless devices. As used herein, a headless device may be inclusive of any type of device that lacks user interface elements. For example, a headless device may lack a monitor, graphical user interface, keyboard or keypad (physical or touchscreen), or mouse. Such lack of user interface elements may make entering data more difficult or time-intensive. Such difficulties or time-intensiveness increase with the number of characters that may need to be entered, as well as the number of characters (e.g., capitalized and lower-case text, numbers, punctuation marks) available.

Notwithstanding the many measures available for securing a wireless network, implementing any one of these measures may be complicated, difficult, and/or require extensive maintenance. There is, therefore, a need in the art for improved systems and methods that provide for restricted access to secured wireless networks that are user-friendly and easily maintained without requiring a high degree of technical expertise and/or ongoing technical support.

SUMMARY OF THE INVENTION

Exemplary systems and methods of the present invention provide for provisioned configuration of wireless devices to allow access to restricted wireless networks. Using an open wireless or wired network, a user of a wireless device may be authenticated. An executable application, which includes the parameters and policies of a provisioned configuration, is generated, transferred to, and executed on the wireless device. Following configuration by the application, the wireless device is allowed to access the restricted wireless network within the parameters and policies of the provisioned configuration as provided through the executable application.

The executable applications providing such provisioned configurations may be generated based on authentication information concerning the user and/or the wireless device. Some embodiments include determining from a provisioned configuration database which parameters and policies are associated with the user and/or wireless device. In some embodiments of the present invention, the application may provide a plurality of provisioned configurations for the wireless device. Each of the plurality of provisioned configurations may include parameters and policies for a plurality of wireless networks. The executable application may be capable of configuring a wireless device for access to a variety of different wireless networks.

Embodiments of the present invention may include systems for provisioned configuration of wireless devices. Such systems may include an authentication module, a processor, and a provisioning module. Some embodiments further include a provisioned configuration database and/or an executable generation module.

Some embodiments of the present invention include computer readable storage media and instructions for provisioned configuration of wireless devices. Some embodiments further include instructions for generating configuration applications based on authentication information concerning the user and/or the wireless device.

DETAILED DESCRIPTION

Embodiments of the present invention include systems and methods for user-friendly, low-maintenance configuration of wireless devices for accessing restricted wireless networks. A user of a wireless device is allowed to connect to an open wireless or wired network. After the user is authenticated, an application may be generated that would allow the wireless device to connect to a secured or restricted wireless network. The application, after being transferred to and executed on the wireless device, configures the wireless device so that it may access the restricted wireless network. The configuration, which may also referred to as a provisioned configuration, may be based on user information, wireless device information, or both. In some embodiments, the application may be able to configure the wireless device so that it may access a plurality of wireless networks.

Figure 1:
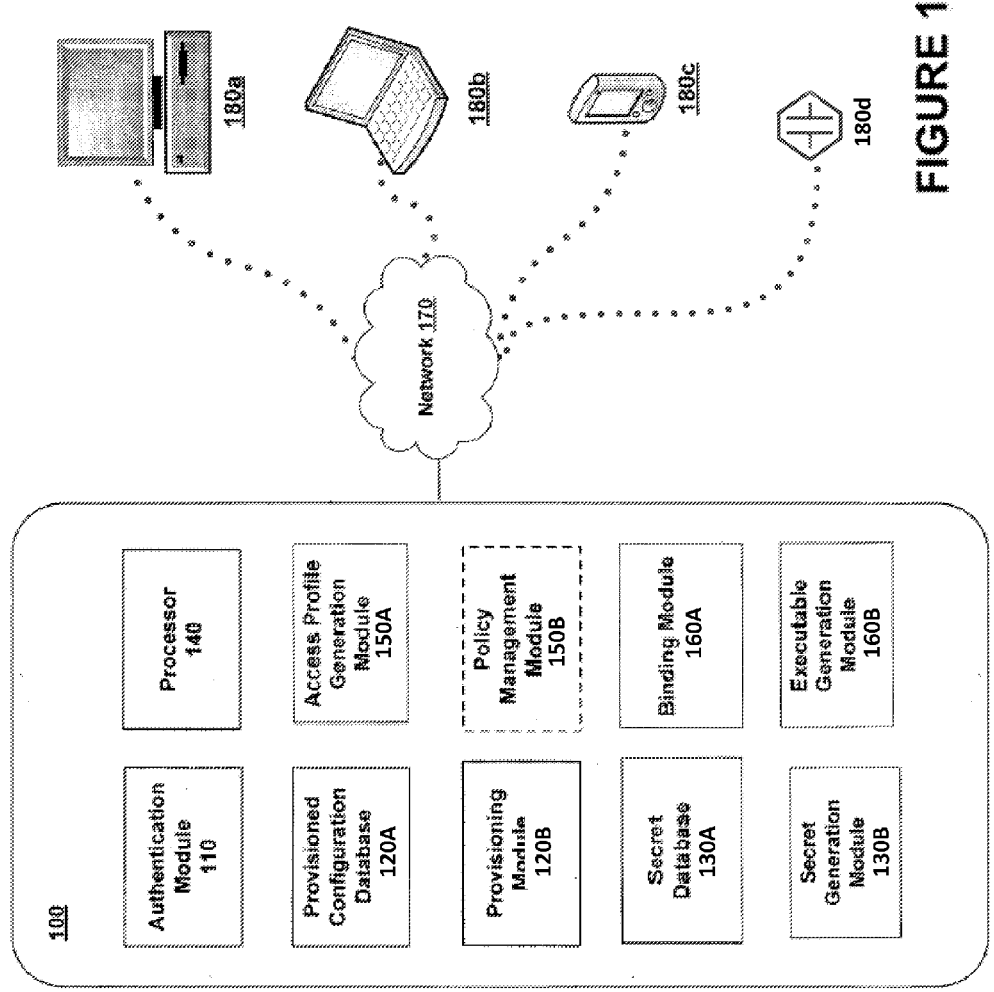
FIG. 1 is an illustration of a system for provisioned configuration of wireless devices to access a restricted wireless network in accordance with an exemplary embodiment of the present invention.

FIG. 1 is an illustration of a system for provisioned configuration of wireless devices to access a restricted wireless network in accordance with an exemplary embodiment of the present invention. Authentication server 100, as illustrated in FIG. 1, includes an authentication module 110, a provisioned configuration database 120A, provisioning module 120B, secret database 130A, secret generation module 130B, a processor 140, access profile generation module 150A, policy management module 150B, binding module 160A, and executable generation module 160B. The authentication server 100 may be used to maintain security in network 170. Various client devices, such as wireless workstation 180*a*, laptop 180*b*, mobile device 180*c*, and headless device 180*d*, belong to a user of network 170.

A module (or application), as referenced in the present invention, should be generally understood as a collection of routines that perform various system-level functions and may be dynamically loaded and unloaded by hardware and device drivers as required. The modular software components described herein may also be incorporated as part of a larger software platform or integrated as part of an application specific component.

Authentication module 110 authenticates a user (e.g., laptop 170*b*) and verifies that the user is who they purport to be and that they are otherwise authorized to access network 160. The authentication module 110 may be used to verify a user name and password supplied by the user over a wired or wireless network. Verification may occur through comparison with user names and passwords stored in an authentication database, which may be independent of or incorporated into authentication module 110. Once authenticated by authentication module 110, the user may access data and perform actions within network 160 based on the user's security clearance level, the parameters of the user's role in the organization, as defined by a network administrator, as may be further governed by the parameters and policies of a provisioned configuration, and as may be further governed by a paired secret or derived keys. Authentication module 110 may implement certain authentication policies disclosed in U.S. patent application Ser. No. 11/788,371 filed Apr. 18, 2007 and entitled "Dynamic Authentication in Secured Wireless Networks," the disclosure of which has previously been incorporated herein by reference.

Provisioned configuration database 120A stores information concerning various sets of parameters and policies that may be used to configure a wireless device for access to network 170. Provisioned configured database 120A may further store certificates, shared secrets, private keys, and a variety of other information. These parameters and policies may include information used to configure a wireless device for connection to a restricted wireless network and access policies related to the same, such as a wireless network name, wireless device parameters, adapter configurations, security-related parameters, access constraints, quality of service parameters, security-related parameters, and the like. Provisioned configuration database 120A may further store information concerning the users and/or wireless devices associated with one or more provisioned configurations.

In an exemplary embodiment, an authenticated user may request access to a restricted wireless network. A provisioned configuration associated with that user and/or the wireless device belonging to the user may be found by searching provisioned configuration database 120A. Once that provisioned configuration is located and subsequently installed on the wireless device belonging to the user, the user is allowed to access the wireless network 170 using the wireless device. Further, the provisioned configuration restricts the user from accessing any portion or sub-sets of the network for which the user is not authorized. Provisioned configuration database 120A may operate in conjunction with and provide provisioned configuration information to other components of authentication server 100, including (but not limited to) provisioning module 120B, and optional policy management module 150B, and executable generation module 130.

In some embodiments, and as referenced above, provisioned configuration database 120A may operate in conjunction with executable generation module 160B. Using a provisioned configuration provided by provisioned configuration database 120A, executable generation module 160B generates an application for configuring a wireless device according to the provisioned configuration. The application may then be transferred to the wireless device via provisioning module 120B as discussed in further detail herein. The application may execute automatically, or the application may be manually executed by the user. Once executed, the application may survey the wireless device, configure the wireless device, and/or connect the wireless device to the restricted wireless network 170. Configuring the wireless device may include installing any or all of the parameters, policies, and the like included in the provisioned configuration acquired from database 120A. Once configured, the wireless device can access the wireless network 160 within the parameters and policies of the provisioned configuration.

Provisioning module 120B is configured to deliver (or allow for the delivery/transfer) the self-configuring application generated by the executable generation module 160B to a wireless device. This delivery may occur over an open access network as part of a wireless download operation. Transfer may also occur over a wired network. The parameters and policies, as included in the provisioned configuration, determine whether a user may access a particular wireless network and to what extent. For example, a user may be authorized to access only one wireless network and/or only for certain operations. The provisioned access application provided by provisioning module 120B may implement certain security and/or access policies disclosed in U.S. patent application Ser. No. 11/788,371 filed Apr. 18, 2007 and entitled "Dynamic Authentication in Secured Wireless Networks," the disclosure of which has previously been incorporated herein by reference.

Secret database 130A stores information concerning various secrets generated by secret generation module 130B. Secret database 130A may also store information concerning which user is associated with a particular secret, any security keys derived from a secret, which wireless device, if any, is associated with a user's secret or security keys, and the like. Secret database 130A may further store information concerning user names, passwords, security clearance levels, and the like. Secret database 130A may operate in conjunction with authentication module 110 to authenticate users and interfaces belonging to the users to the network 170.

Secret generation module 130B generates a random secret for each user. Various algorithms and formulas may be used by secret generation module 130B to randomly generate secrets. By providing for random secrets, secret generation module 130B increases the difficulty for potential trespassers to deduce or otherwise determine a particular secret and illicitly gain access to network 170. Secret generation module 130B is further configured to determine that each secret is unique to each user, so that each secret may only be used by one user. The secret may be bundled as part of an access profile. The secret will be used to authenticate a wireless device so that the wireless device can access the wireless network 170. In some embodiments, secret generation module 130B may derive from a particular secret a set of one or more security keys for a user. Like secrets, security keys may be associated with a wireless device and used in configuring the wireless interface so that it may access the wireless network 170. Also like secrets, no other wireless device may then use those same security keys to access the network 170.

Processor 140 is configured to execute a variety of operations. For example, by using authentication information concerning the user and/or the wireless device, the processor 140 may search provisioned configuration database 120A for a provisioned configuration that is associated with the user and/or the wireless device. Processor 140, by executing instructions and/or applying data sets related to and/or provided by executable generation module 160A, may then generate the aforementioned configuration application. Processor 140, by executing instructions and/or applying data sets related to and/or provided by provisioning module 120B, may provide for the transfer of the configuration application to a wireless device over network 170.

Access profile generation module 150A generates an access profile for a user authenticated by authentication module 110. A user access profile may include, at the least, a random paired secret and an executable as is further described herein. An access profile may further include information concerning the user, such as authentication information, security information, user preferences, and the like. To access the network 170, a user copies, downloads, or otherwise transfers the user access profile to the user's client device (e.g., laptop 180b). Access profiles may be securely obtained via a common web browser utilizing hypertext transfer protocol over secure socket layer (HTTPS). The executable automatically configures a wireless device so that they may access the wireless network 170.

Optional policy management module 150B may also be included as a part of authentication server 100. Policy management module 150B may be responsible for management and enforcement of parameters and polices of access for a device access network 170. The parameters and policies may include those implemented as a part of the provisioned configuration process. These parameters and policies may further include what users are allowed to access to particular network and to what extent (e.g., particular operations, limited access, etc.). Some wireless networks may implement policy management and enforcement through a separate server dedicated to policy management and enforcement.

Binding module 160A is configured to associate (bind) a user's secret to a wireless interface device belonging to the user (e.g., workstation 180a, laptop 180b, mobile device 180c, headless device 180d). The association formed by binding module 160A between a secret and a user's wireless interface device is required for the wireless interface to be authenticated and allowed access to the wireless network 170. In some instances, immediately after secret generation and/or association with an access profile, binding module 160A associates the user's secret to the user's wireless interface device (if the user is using a wireless interface device) or a profile assigned to the interface device. The immediate operation of binding module 160A may be referred to as prompt binding. Alternatively, the operations of binding module 160A may be delayed until the user initiates the first wireless connection via the wireless interface and the MAC address of the user's wireless device may be determined. The delayed operation of binding module 160A may be referred to as delayed binding.

As noted above, an executable generation module 160B generates an executable application that configures a wireless interface for access to the wireless network 170. The executable generated by executable generation module 160B may then be copied, downloaded, or otherwise transferred to a wireless interface belonging to the user. The executable may be bundled as part of an access profile. The executable may install the access profile generated by access profile generation module 150A and the secret generated by secret generation module 130B onto the wireless device. Generation of this executable and the aforementioned access profile are further disclosed in U.S. provisional patent application 60/796,845, the disclosure of which has been previously incorporated by reference.

Network 170 may be configured to transmit various electromagnetic waves, including, for example, radio signals. Network 170 may be an IEEE 802.11 (Wi-Fi or Wireless LAN) network, IEEE 802.16 (WiMAX) network, IEEE 802.16c network, or the like. Network 170 may convey various kinds of information to interface devices, such as client interface devices 180a-d. Network 170 may be a local, proprietary network or may be a part of a larger wide-area network.

Various subsidiary networks may reside within the realm of greater network 170 such as peer-to-peer or wireless mesh networks. Portions of network 170 may be "open" to allow for provisioning prior to a device being allowed to access "closed" portions of the same. Network 170, in some embodiments, may include a wired network for devices 180a-d (described below) to be authenticated and to download the executable application with provisioned configuration. Certain portions of network 170 may be devoted to authentication and downloading an executable provisioning application whereas other portions may be dedicated for general wireless usage.

Client wireless-interface devices 180a-d illustrate a variety of wireless-capable devices, including desktop computers, laptop computers, handheld computers, and the like. A user wishing to access the wireless network 170 through wireless device 180a, for example, may do so by copying, downloading, or otherwise transferring to wireless device 180a a copy of the application generated by executable generation module 160B and made available by provisioning module 120B. The application configures wireless device 180a so that wireless device 180a can access the wireless network 170 within the parameters of a provisioned configuration. Wireless devices 180b-d may be configured in similar fashion. Headless device 180d may not be configured by an executable, but alternatively receive a secret or security key as generated by secret generation module 130B. In some instances, headless device 180d may receive the secret or security key through an intermediary device (e.g., wireless device 180c).

In an exemplary embodiment of the present invention, a user submits a request for authentication and access to restricted wireless network 170. The request may include user information (e.g., user name and password) and/or wireless device information. Following an optional authentication operation, processor 140 uses the information from the request to search provisioned configuration database 120A for parameters and policies associated with the user and/or wireless device. That information concerning the aforementioned parameters and policies may then be provided to executable generation module 160B for generation of a provisioned configuration application.

A user's secret may be updated periodically or in response to a request by a network administrator. A new secret may be generated for the user by secret generation module 130B, associated with the user's access profile, and saved to the secret database 130A. If the previous secret has expired, the wireless interface must be reauthenticated. The user must either reauthenticate immediately or reauthenticate at the next wireless connection. Reauthenticating the wireless device may include reauthenticating the user, transferring copies of the user's new secret, access profile, and/or a new executable, and, using binding module 160A, forming a new association between the wireless interface and the new secret.

Figure 2:
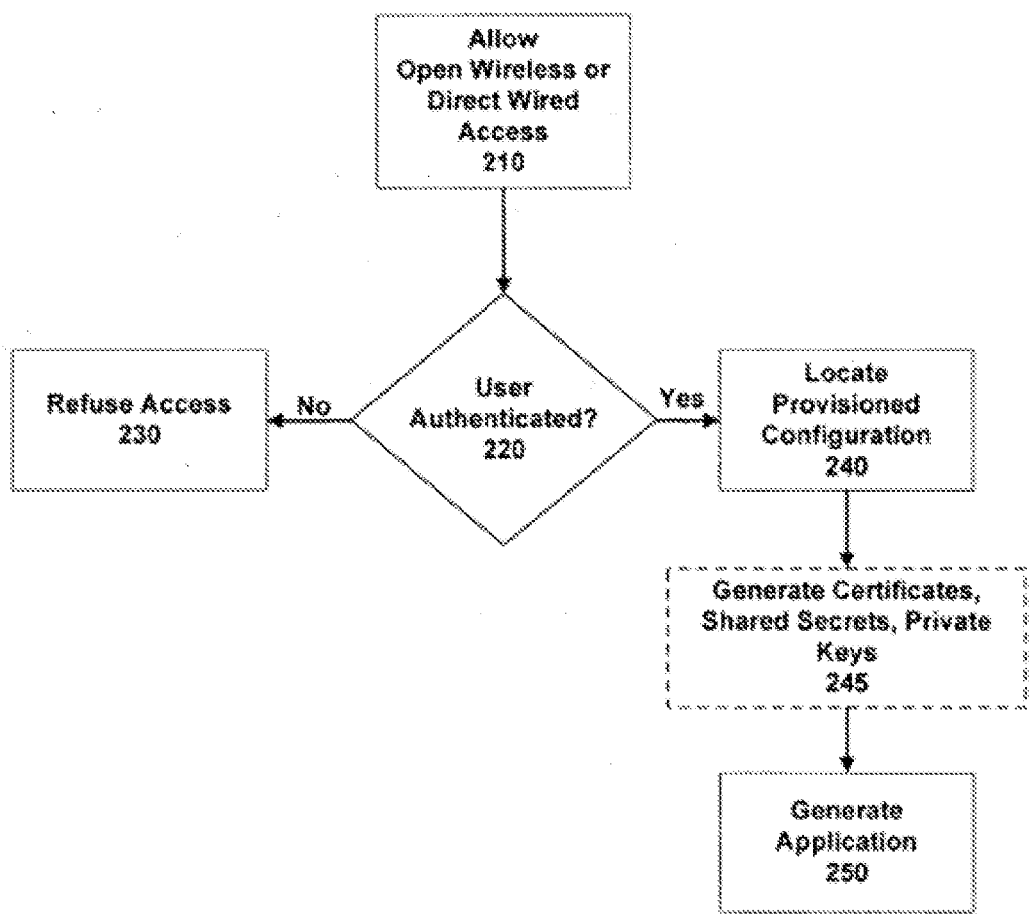
FIG. 2 is a flowchart illustrating a method for generating a configuration application in accordance with an exemplary embodiment of the present invention.

FIG. 2 is a flowchart illustrating a method 200 for generating a configuration application in accordance with an exemplary embodiment of the present invention. In method 200, a wireless device is allowed to connect to an open wireless network. It is then determined whether the user is successfully authenticated. If the user is not authenticated, the user and wireless device are refused access to the restricted wireless network. If the user is successfully authenticated, a provisioned configuration associated with the authenticated user and/or the wireless device is located. An application for configuration of the wireless device based on the provisioned configuration is generated.

In step 210, an open wireless network is accessed by a wireless device 180a-d. The open wireless network is unsecured so that an unauthenticated user and/or wireless device 180a-d belonging to the user may form a connection. Once the wireless device 180a-d is connected to the open wireless network, the user and/or wireless device 180a-d may be allowed to perform various operations, including authentication. Direct wired access may also occur in step 210.

In step 220, it is determined whether the user has been successfully authenticated. The user may be authenticated using authentication module 110 using information from the user and/or the wireless device 180*a*-*d*. Initial authentication may include providing a user name and password identifying the user as a particular user. Determining whether the user is successfully authenticated may include verifying that the authentication information from the user and/or wireless device 180*a*-*d* corresponds with the authentication information from the authentication database or authentication module 110.

In step 230, the user was not authenticated. This may occur where the user is not currently authorized to access the secured wireless network, the user entered incorrect authenticated information, or the like. If a user cannot be authenticated, the user may not be allowed to access the secured wireless network.

In step 240, the user has been successfully authenticated. The authentication information from the user and/or wireless device 180*a*-*d* may be used to locate the provisioned configuration associated with the user and/or wireless device 180*a*-*d*. Provisioned configuration database 120 may be searched and a provisioned configuration associated with the user and/or wireless device 180*a*-*d* is retrieved. For some headless devices (e.g., headless device 180*d* of FIG. 1), a secret or security key may be located and retrieved from secret database 130A instead of a full provisioned configuration.

In optional step 245, certificates, shared secrets (like those described in co-pending U.S. application Ser. No. 11/788, 371 for "Dynamic Authentication in Secured Wireless Networks"), and/or private keys may be generated. These certificates and so forth may be generated by executable generation module 160B or in conjunction with another optional application dedicated to certificate generation and so forth.

In step 250, an application including the provisioned configuration is generated by executable generation module 160B. This application may include the certificates and so forth generated in optional step 245. In some embodiments, the generation operations of step 245 and 250 may be consolidated into a single operation. Using the provisioned configuration located in step 240, executable generation module 160B generates an application that, when executed, will configure the wireless device or another wireless device so that the wireless device can access restricted wireless network 170 within the parameters and policies for the user and/or wireless device.

Figure 3:
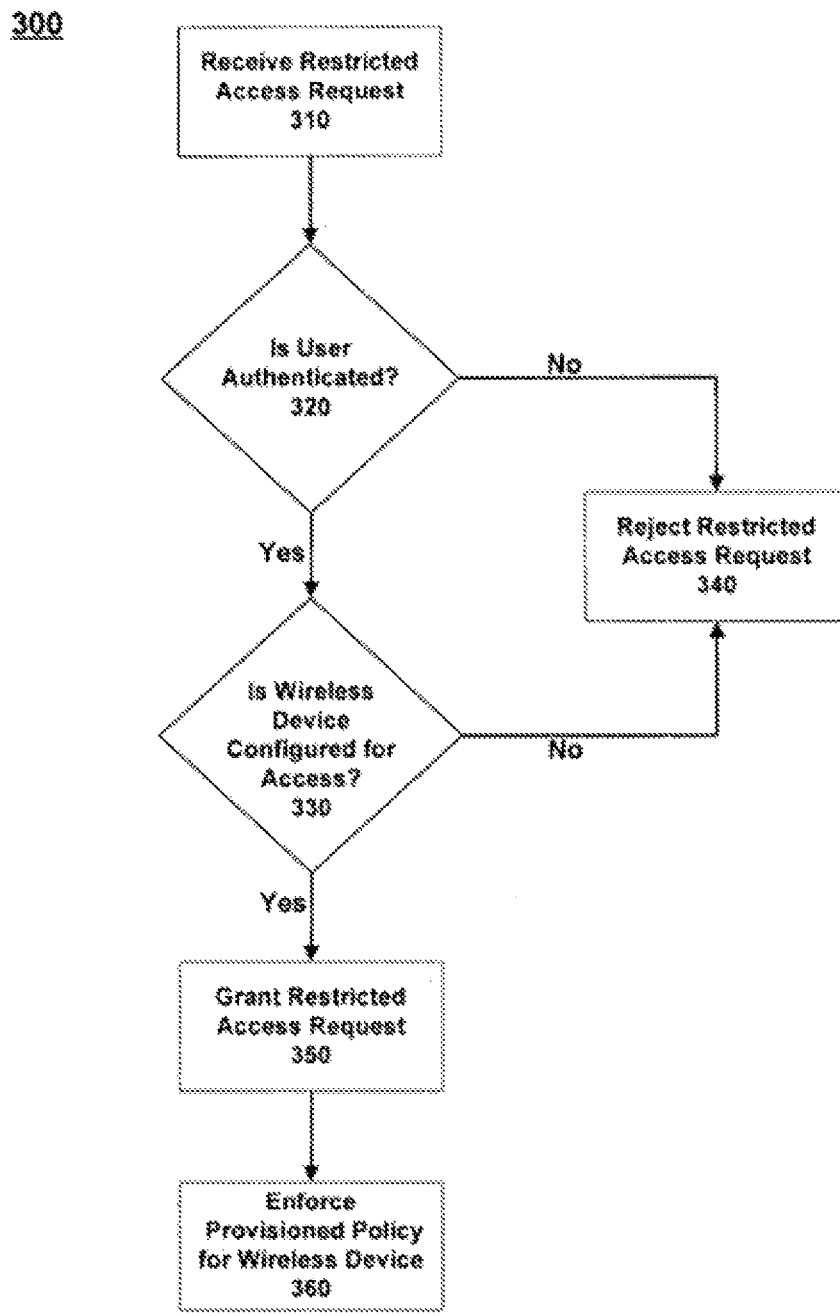
FIG. 3 is a flowchart illustrating a method for wireless devices to access a restricted wireless network in accordance with an exemplary embodiment of the present invention.

FIG. 3 is a flowchart illustrating a method 300 for wireless devices to access a restricted wireless network 170 in accordance with an exemplary embodiment of the present invention. In method 300, a request for access by a wireless device to the restricted wireless network is received. It is then determined whether the user is successfully authenticated. If the user cannot be successfully authenticated, the request for access is denied. If the user has been successfully authenticated, it is then determined whether the wireless device has a provisioned configuration that would allow for access to the restricted wireless network 160. If the wireless device has no such provisioned configuration, the request for access to the restricted wireless network 160 is denied. If the wireless device does have a provisioned configuration allowing for access, the request is granted. Further, the parameters and policies of the particular provisioned configuration are enforced for the user, wireless device, and their operations within the restricted wireless network.

In step 310, a request for access to a restricted wireless network 170 is received from a wireless device belonging to a user. The request for access may be received through an open wireless network, a wired connection, or the like.

In step 320, it is determined whether the user has been successfully authenticated. The determination may be performed in a manner similar to that of step 220. If the determination is that the user has been successfully authenticated, the method proceeds to step 330. If the determination is that the user has not been successfully authenticated, the method proceeds to step 340.

In step 330, it has been determined that the user was not successfully authenticated and the request for access to the restricted wireless network 170 is rejected. This may occur where the user is not currently authorized to access the restricted wireless network, the user entered incorrect authenticated information, or the like. Rejection of the access request may include terminating the connection, enforcing various security measures (e.g., identifying the illicit or unauthorized access attempt by date, time, and indicia of the user attempting access), or the like.

In step 340, it has been determined that the user was successfully authenticated. It is then determined whether the wireless device is configured for access to the restricted wireless network. The determination may be made by surveying the wireless device, information from the authentication request, comparing the configuration of the wireless device with the provisioned configuration in provisioned configuration database 120A, or the like. If the wireless device has been configured for access to the restricted wireless network 170, the method proceeds to step 350. If it is determined that the wireless device is not configured, the method proceeds to step 330. Determinations made in step 350 may utilize those techniques disclosed in U.S. patent application Ser. No. 11/788,371 filed Apr. 18, 2007 and entitled "Dynamic Authentication in Secured Wireless Networks," the disclosure of which has previously been incorporated herein by reference.

In step 350, the wireless device has been determined to have been configured for access to the restricted wireless network 170, and the request for access is granted. In some embodiments, the wireless device may be automatically connected to the restricted wireless network 170. Alternatively, the connection may be made manually.

In step 360, access by the wireless device to restricted wireless network 170 is governed by the parameters and policies of the provisioned configuration. Optional policy enforcement module 150B may enforce those parameters and policies, so that the user may only access the network or networks for which the user is authorized.

Figure 4:
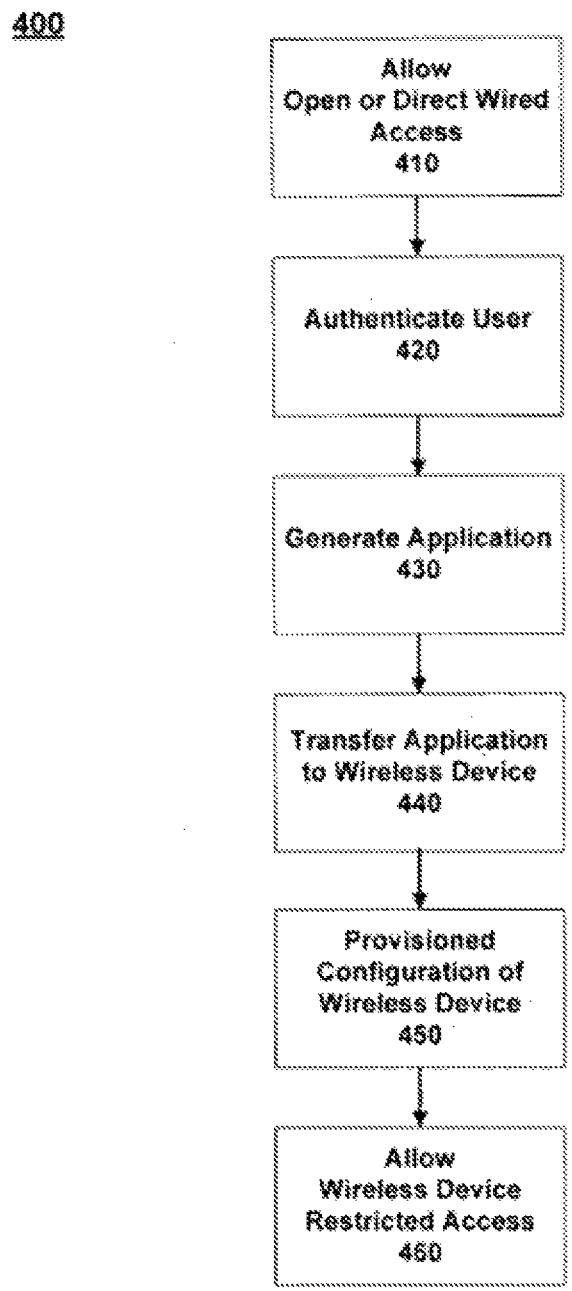
FIG. 4 is a flowchart illustrating a method for provisioned configuration of a wireless device to access a restricted wireless network in accordance with an exemplary embodiment of the present invention.

FIG. 4 is a flowchart illustrating a method for provisioned configuration of a wireless device to access a restricted wireless network 170 in accordance with an exemplary embodiment of the present invention. A wireless device belonging to a user is allowed to connect to an open wireless network. The user is authenticated. Using information from authentication, a configuration application is generated. The application is then transferred to the wireless device. The application provides a provisioned configuration for the wireless device. Once the wireless device is configured, the wireless device may be allowed to access the restricted wireless network 170.

In step 410, the wireless device belonging to the user is allowed to access an open wireless network. The connection to the open wireless network may be similar to that of step 210. Also like step 210, direct wired access may be provided.

In step 420, the user is authenticated using authentication module 110. Authentication of the user and/or wireless device may occur by comparing various information such as user names and passwords against information in an authentication database or authentication module 110. Techniques disclosed in U.S. patent application Ser. No. 11/788,371 filed Apr. 18, 2007 and entitled "Dynamic Authentication in Secured Wireless Networks," the disclosure of which has previously been incorporated herein by reference, may also be utilized.

In step 430, an executable application including the provisioned configuration is generated by executable generation module 160B. The generation of the application may occur similarly to the generation of the application in step 250. For some headless devices (e.g., headless device 180d of FIG. 1), a secret or security key may be generated by secret generation module 130B instead of a full executable application.

In step 440, the application (or security key) is transferred to the wireless device via provisioning module 120B. The application (or security key) may be copied, downloaded, or otherwise transferred to the wireless device. In some embodiments, the application may be automatically transferred to the wireless device after the application (or security key) is generated in step 430. Alternatively, the application (or security key) may be made available for the user to copy, download, or otherwise transfer over the open wireless network. The application (or security key) may also be provided as a part of a computer-readable medium such as an installation CD or via portable flash memory cards.

In step 450, the application as provided by provisioning module 120B is executed and provides a provisioned configuration for the wireless device to access restricted wireless network 170. The application transferred in step 440 may be executed automatically or by the user to install the provisioned configuration, including the various parameters and policies associated with the user and/or wireless device. After the provisioned configuration is installed, the wireless device becomes capable of accessing the restricted wireless network 170. Likewise, for headless devices, a transferred security key may be used to access the restricted wireless network 170.

In step 460, the wireless device connects to and accesses the restricted wireless network 170. The wireless device may be connected to the restricted wireless network 170 either automatically or manually. The access to restricted wireless network 170 is governed by the parameters and policies of the provisioned configuration installed on the wireless device and/or other security measures (e.g., security key) as may be implemented to maintain to the security of the network 160. Parameters and polices may be enforced by policy management module 150B.

Figure 5:
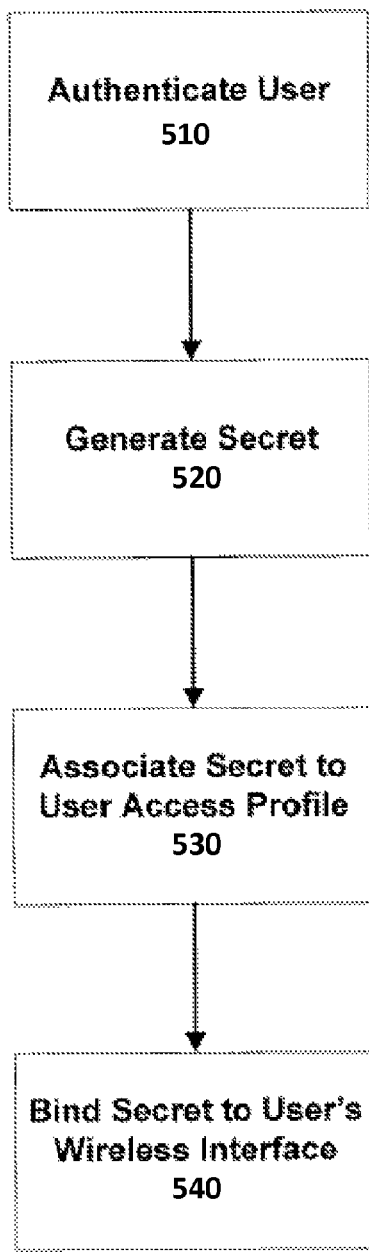
FIG. 5 is a flowchart illustrating a method for using paired secrets in a secured wireless network.

FIG. 5 is a flowchart illustrating a method 500 for using paired secrets in a secured wireless network 170. In method 500, a user is authenticated, a random and unique paired secret is generated for the user, the secret is associated with an access profile belonging to the user, and the secret is further associated (bound) with a wireless interface belonging to the user and further associated with a particular access profile.

In step 510, the user is authenticated using authentication module 110. Initial authentication may include providing a user name and password identifying the user as a particular user. That user may or may not be authorized to access the network 170 as may be determined with respect to paired secrets. If a user cannot be authenticated through a simple user name and password match (or subsequently with respect to paired secrets), the user may not be allowed to access the wireless network 170.

In step 520, a secret is generated for the provisionally authenticated user. Generated by secret generation module 130B, the secret may be determined through various algorithms or formulas so that a randomly generated secret is produced for the authenticated user. Further, the secret is unique to each user in the network 170. The uniqueness of the secret for each user provides each user protection from all other users in the network 170. Because each user has a secret uniquely bound to that specific user (or their profile and/or interface device), there is no way for a user to use another user's secret. Further, when a particular user is no longer authorized to use the network 170, that user's de-authorization does not affect the ability of other users to continue using the network 170 as is the case in many prior art network security solutions. Further, de-authorization of a particular user does it require any particular technical expertise or technical support to maintain the security of the network 170. Also in step 520, other information entities associated with the wireless authentication mechanism, such as authority certificates, may be generated.

In step 530, the secret generated for an authenticated user is associated with that user's access profile, which may be further associated with a particular interface device. Information concerning the association between the secret and the user access profile may be saved in secret database 130A.

In step 540, the secret is associated (bound) with a wireless interface belonging to the authenticated user, their profile, and/or device. The association may be formed by binding module 160A and allows the wireless interface device to access the wireless network 170. The association, or binding, may include downloading an access profile, a paired secret and associated derived security keys, and an executable for configuring and associating the wireless interface device with the secret. For some headless device, binding may merely involve a security key. The secret or security key may be associated with the wireless interface by associating the secret with a specific radio of the wireless interface, a MAC address of the wireless interface, or other characteristics of the wireless device. Information concerning the association between the paired secret and wireless interface may be saved in secret database 130A, which may be updated over time as additional communications with the wireless device provide more information regarding various features and characteristics of the wireless device. As such, the binding may be updated to include such information over time, such that access to the secured wireless network may not only require the security key, but also the updated information specific to the particular wireless device and reflected in the association or binding.

Figure 6:
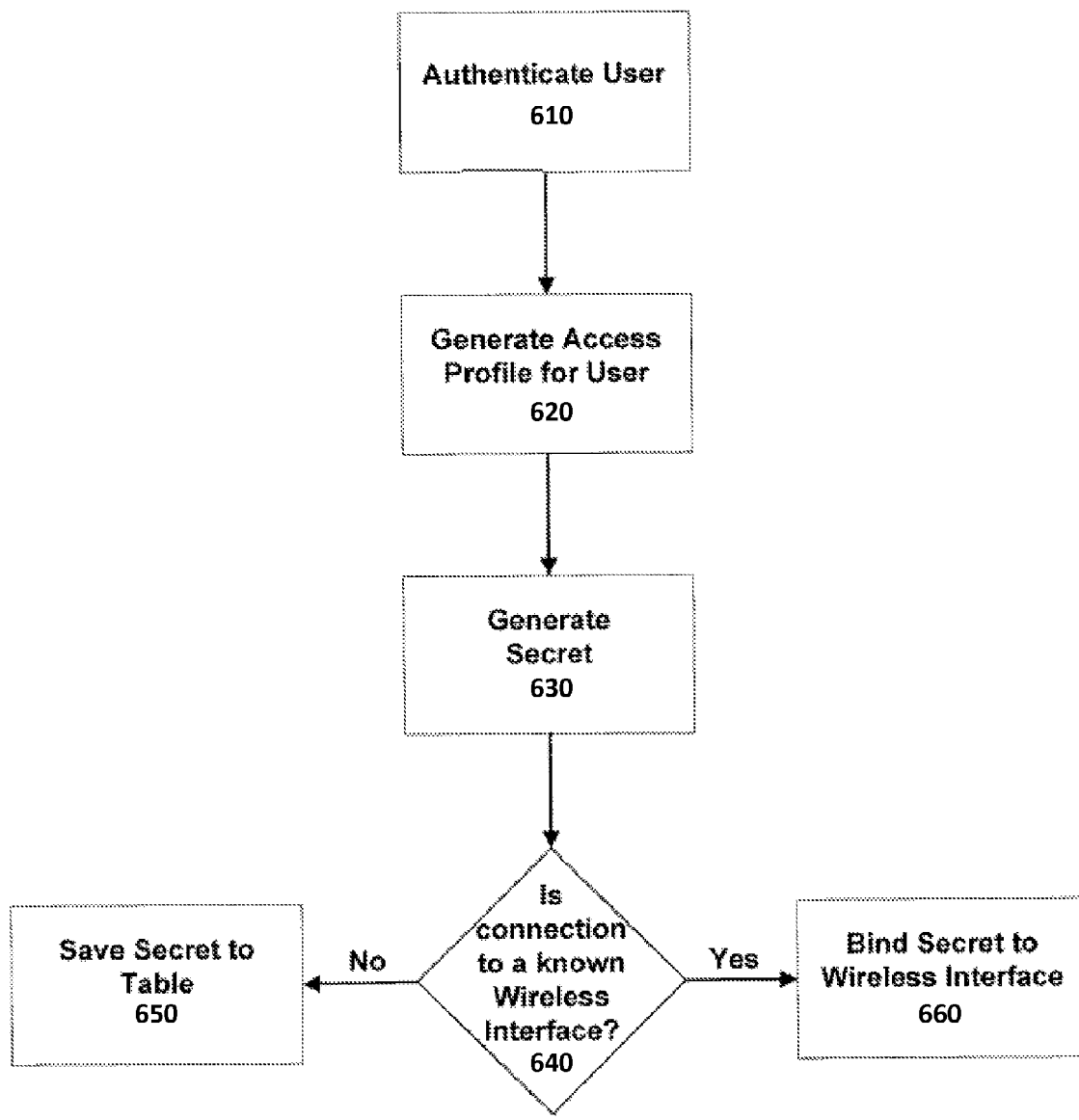
FIG. 6 is a flowchart illustrating an alternative method for using paired secrets in a secured wireless network.

FIG. 6 is a flowchart illustrating an alternative method 600 for using secrets in a secured wireless network 170. In this method 600, the user is authenticated as may occur through an initial user name and password verification process, an access profile is generated, and a secret is generated. If a known wireless interface is connected to the network 170, then that wireless interface is associated (bound) with the secret. If there is no known wireless interface currently connected to the network 170, then the unassociated secret may be saved and can be later associated with a wireless interface.

In step 610, the user is authenticated by authentication module 110. The authentication may be performed in a similar fashion to the authentication performed in step 510.

In step 620, an access profile is generated for the authenticated user. The access profile, generated by access profile generation module 150A, may be used to configure a wireless interface belonging to the user so that they may access the network 170.

In step 630, a secret is generated for the user. The generation of the secret may be performed in a manner similar to that of step 520 of FIG. 5.

In step 640, the determination is made whether the current network connection is through a known wireless interface. The determination may be based on authentication information, user input, or the like.

In step 650, where the connection is (for example) determined not to be a known wireless interface already having a bound secret, the most recently generated secret is saved to a table. The table may be included in secret database 130A. Where the user is not using a wireless interface, the wireless interface is not the intended interface to be used in a multi-wireless-interface (radio) device, the user is not using the user's own wireless interface, or the user is otherwise not ready to associate the wireless interface with the secret, the secret may be saved to the table for later use.

In step 660, where the connection is determined to be a known wireless interface not having a bound secret, having an expired secret, or otherwise in need of a bound secret, the secret is bound with the wireless interface. The association may be formed in a similar manner as the association formed in step 540.

Figure 7:
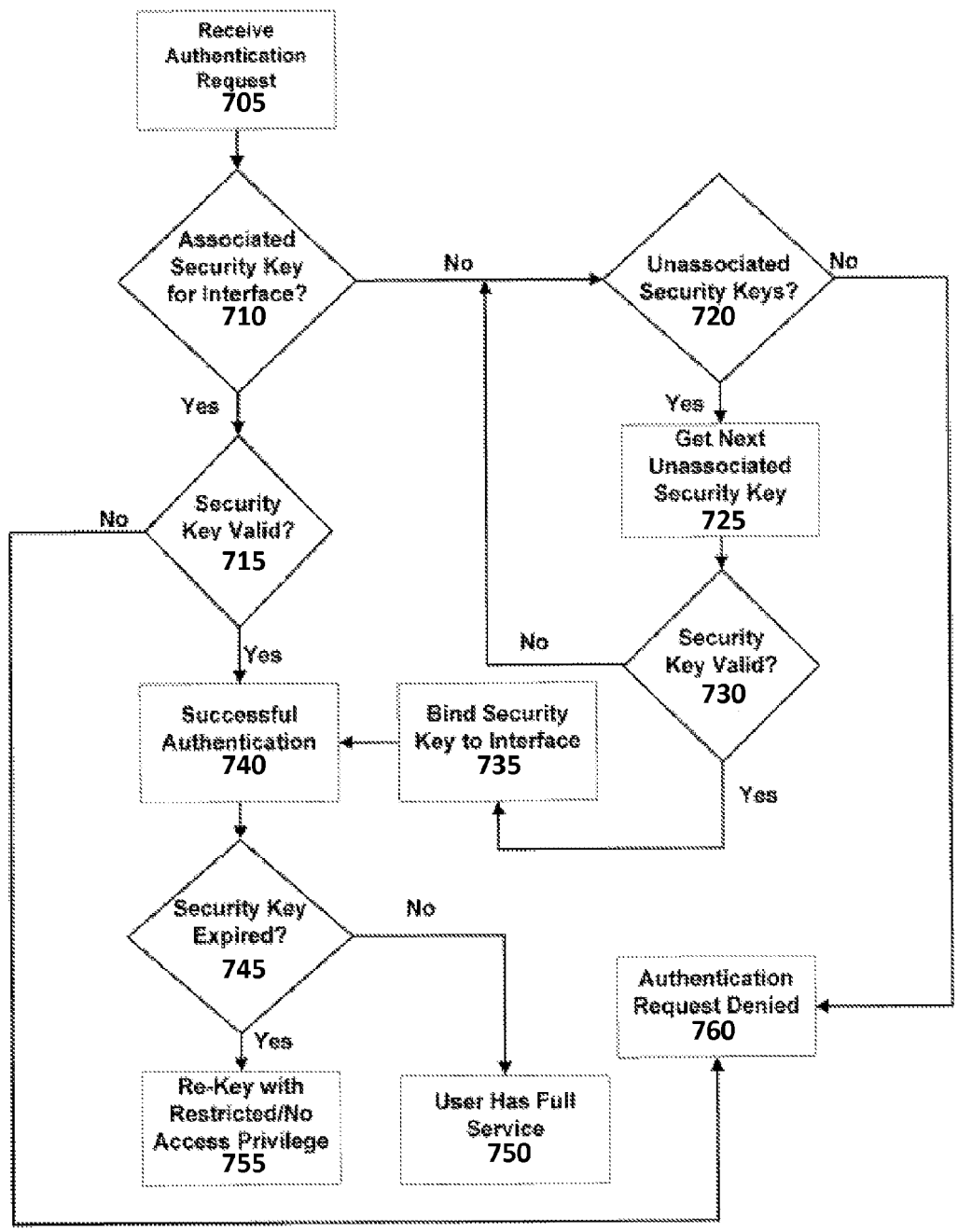
FIG. 7 is a flowchart illustrating a method for using security keys in a secured wireless network.

FIG. 7 is a flowchart illustrating a method 700 for using security keys in a secured wireless network 170. In this method, an authentication request is received from a wireless interface. It is then determined whether a security key is associated with the interface, and if so, it is determined whether the security key is valid. If the security key is valid, then the wireless interface is successfully authenticated. If the security key is not valid, the authentication request is denied. If there is no security key associated with the interface, it is determined whether there are any unassociated security keys for the user. If there are unassociated security keys, then the next unassociated security key is obtained. It is then determined whether the security key is valid. If the security key is not valid, it is determined again whether there are any unassociated security keys. If there are no unassociated security keys left, the authentication request is denied. If there is an available unassociated security key and it is valid, then the security key is bound to the interface, and the wireless interface is successfully authenticated.

In step 705, an authentication request is received from a wireless interface belonging to a user. This request may occur when the wireless interface is new to the network 170, for wireless interfaces whose security key has expired, for wireless interfaces whose connection was terminated, or the like.

In step 710, it is determined whether there is a security key associated with the wireless interface. The determination may be made from information in the wireless interface authentication process. If there is an associated security key, the method proceeds to step 715. If there is no associated security key, the method proceeds to step 720.

In step 715, where the security key is determined to be associated with the wireless interface, it is then determined whether that security key is valid. The determination may be made by comparing the security key information from the authentication request with the security key in secret database 130A.

In step 720, where there is no security key associated with the wireless network 170, it is determined whether there are any unassociated security keys for the user. The determination may be made based on information from the authentication request, security key information associated with the user access profile saved in secret database 130A, and the like. If there is an unassociated security key available, the method proceeds to step 725. If there are no unassociated security keys available, the method proceeds to step 760.

In step 725, where it was determined that there are unassociated security keys available, the next unassociated security key is obtained. All unassociated security keys are saved to a table, as described in step 650. In some embodiments, the table is included in secret database 130A. In step 725, the next available unassociated security key from the table is considered.

In step 730, it is determined whether the security key under consideration is valid. The determination of whether the security key is valid is similar to the determination made in step 715. If the security key is not valid, the method returns to step 720. If the security key is valid, the method proceeds to step 735.

In step 735, the security key is bound to the wireless interface. The binding, or association, is formed similarly to the association formed in steps 540 and 660.

In step 740, the authentication of the wireless interface by security key is successful. In some embodiments, the method may proceed with further authentication steps. For example, in step 745, a determination may be made as to whether the security key has expired. If the key has expired, a re-keying process may commence in step 745. In the interim, however, the user may be subjected to restricted access or no access whatsoever. In some embodiments, the re-keying process of step 755 may be a part of a different process while the user has limited or no access privileges. If they key is still valid, however, the user may enjoy full service access in step 750. Authenticating the wireless interface, however, allows the wireless interface to access the wireless network 170.

In step 760, the authentication request is denied. The wireless interface is not allowed to access the wireless network 170, or if there is an existing connection, it may be terminated.

Figure 8:
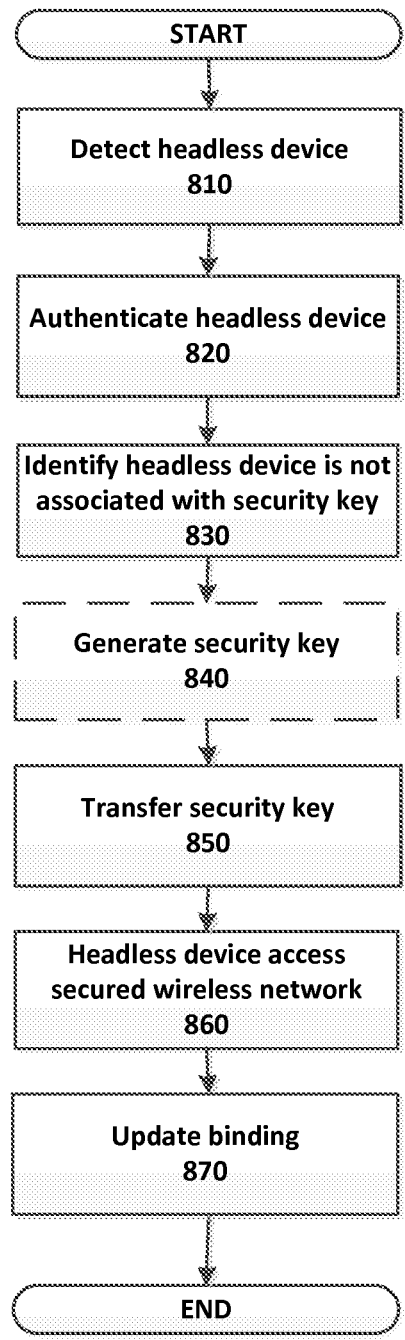
FIG. 8 is a flowchart illustrating a method for sharing a security key with a headless device.

FIG. 8 is a flowchart illustrating a method for sharing a security key with a headless device. In this method, a headless device is detected, authenticated, and identified as not having a security key. A security key may then be generated and transferred to the headless device, which may then access the secured wireless network. The security key is bound to the headless device, and such binding may further be updated over time to improve the security of the secured wireless network.

In step 810, a headless device 180*d* may be detected by another wireless device (e.g., mobile device 180*c*). Such detection may occur via a wireless communication network, such as Bluetooth or WiFi. A mobile device 180*c* may detect the headless device 180*d* when they are within a wireless communication range of each other.

In step 820, the headless device 180*d* may be authenticated by authentication module 110 as described in previous authentication steps 420, 510, and 610.

In step 830, the headless device 180*d* may be identified as not yet being associated with any security key. Such identification may be perform similarly to step 710.

In step 840, a security key may be generated. In some instances, the secret database 130A may have one or more unassigned security keys available. If no unassigned security keys are available, however, secret generation module 130B may generate the security key for the headless device. In some case, the security key may be generated (e.g., at an access point) in the secured wireless network and provided to mobile device 180c to pass on to the headless device. Alternatively, mobile device 180c may have a local secret generation module 130B and may generate the security key locally. In step 850, the security key may be assigned and transferred to the headless device 180d.

In step 860, the headless device 180d may access the secured wireless network using the security key to secure and encrypt its communications. An access point in the secured wireless network may be able to recognize the security key as one associated with the secured wireless network. Such access point may therefore bind (e.g., via binding module 160A) the security key to the headless device. Such binding may involve associating the security key with a MAC address of the headless device.

In step 870, additional information regarding the headless device 180d may be discerned from its communications (e.g., with the access point) in the secured wireless network. Such additional information may be specific to the headless device 180d and may be used to update the binding. In that regard, the access point may be able to "learn" about the headless device 180d and associate such learned information to the security key. As such, use of the security key may not only be associated with the MAC address, but with other characteristics of the headless device 180d. Collectively, the MAC address and the additional information specific to the headless device 180d may serve as a fingerprint to uniquely identify the headless device 180d. As such, security of the secured wireless network may be improved over time as the fingerprint becomes more developed.

While the present invention has been described in connection with a series of preferred embodiment, these descriptions are not intended to limit the scope of the invention to the particular forms set forth herein. To the contrary, the present descriptions are intended to cover such alternatives, modifications, and equivalents as may be included within the spirit and scope of the invention as defined by the appended claims and otherwise appreciated by one of ordinary skill in the art.

What is claimed is:

1. A method for sharing security keys with headless devices, the method comprising:
    detecting a headless device within a wireless communication range;
    executing instructions stored in memory, wherein execution of the instructions by a processor:
    determines that the detected headless device is authenticated for access to a secured wireless network,
    identifies that the detected headless device is not yet associated with any pre-shared keys, and
    assigns a pre-shared key to the detected headless device, wherein the assigned pre-shared key is unique to the detected headless device;
    transferring the assigned pre-shared key to the detected headless device, wherein the pre-shared key is used to encrypt wireless communications between the detected headless device and an access point in the secured wireless network;
    binding the assigned pre-shared key to the detected device at the access point by associating the assigned pre-shared key to a MAC address of the detected headless device;
    in response to one or more communications, identifying one or more other characteristics of the detected headless device and generating a fingerprint of the detected headless device comprising at least the MAC address and the one or more other characteristics of the headless device; and
    dynamically updating the binding to associate the assigned pre-shared key with the fingerprint of the detected headless device.

2. The method of claim 1, further comprising storing one or more unassigned pre-shared keys in a database in memory.

3. The method of claim 2, further comprising receiving the unassigned pre-shared keys from a remote secret generation module over the secured wireless network.

4. The method of claim 2, further comprising executing a local secret generation module to generate the unassigned pre-shared keys.

5. The method of claim 1, wherein the access point recognizes the assigned pre-shared key as being associated with the secured wireless network.

6. An apparatus for sharing security keys with headless devices, the apparatus comprising:
    a communication interface that detects a headless device within a wireless communication range;
    a processor that executes instructions stored in memory, wherein execution of the instructions by a processor:
    determines that the detected headless device is authenticated for access to a secured wireless network,
    identifies that the detected headless device is not yet associated with any pre-shared keys, and
    assigns a pre-shared key to the detected headless device, wherein the assigned pre-shared key is unique to the detected headless device;
    wherein the communication interface transfers the assigned pre-shared key to the detected headless device, wherein the pre-shared key is used to encrypt wireless communications between the detected headless device and an access point in the secured wireless network;
    in response to which, further execution of the instructions by the processor:
    binds the assigned pre-shared key to the detected device at the access point by associating the assigned pre-shared key to a MAC address of the detected headless device;
    in response to one or more communications, identifies one or more other characteristics of the detected headless device and generates a fingerprint of the detected headless device comprising at least the MAC address and the one or more other characteristics of the headless device; and
    dynamically updates the binding to associate the assigned pre-shared key with the fingerprint of the detected headless device.

7. The apparatus of claim 6, further comprising memory that stores a database of one or more unassigned pre-shared keys.

8. The apparatus of claim 7, wherein the communication interface further receives the unassigned pre-shared keys from a remote secret generation module.

9. The apparatus of claim 7, further comprising a local secret generation module stored in memory and executable by the processor to generate the unassigned pre-shared keys.

10. The apparatus of claim 6, wherein the access point recognizes the assigned pre-shared key as being associated with the secured wireless network.

11. A non-transitory computer-readable storage medium, having embodied thereon a program executable by a processor to perform a method for sharing security keys with headless devices, the method comprising:

detecting a headless device within a wireless communication range;

determining that the detected headless device is authenticated for access to a secured wireless network;

identifying that the detected headless device is not yet associated with any pre-shared keys;

assigning a pre-shared key to the detected headless device, wherein the assigned pre-shared key is unique to the detected headless device;

transferring the assigned pre-shared key to the detected headless device, wherein the pre-shared key is used to encrypt wireless communications between the detected headless device and an access point in the secured wireless network;

binding the assigned pre-shared key to the detected device at the access point by associating the assigned pre-shared key to a MAC address of the detected headless device;

in response to one or more communications, identifying one or more other characteristics of the detected headless device and generating a fingerprint of the detected headless device comprising at least the MAC address and the one or more other characteristics of the headless device; and dynamically updating the binding to associate the assigned pre-shared key with the fingerprint of the detected headless device.

* * * * *